No. 765,727. PATENTED JULY 26, 1904.
H. DOCK.
PUPPET VALVE.
APPLICATION FILED NOV. 5, 1903.
NO MODEL.
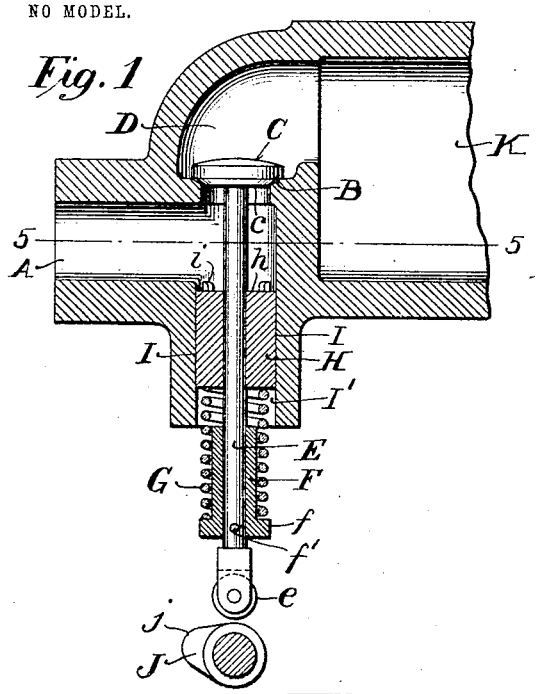
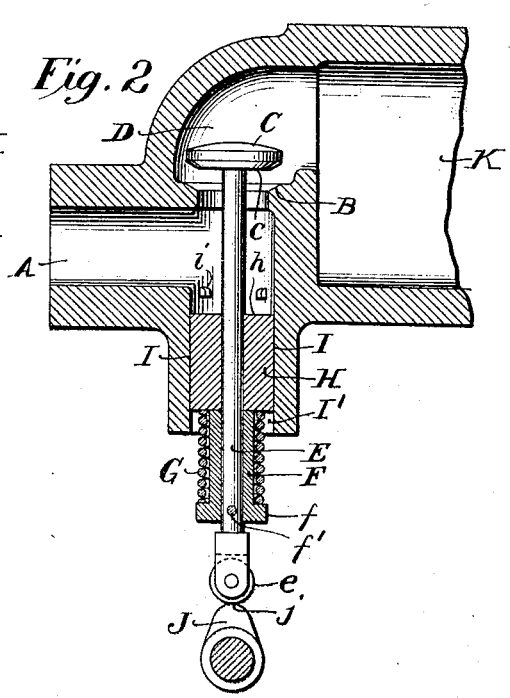
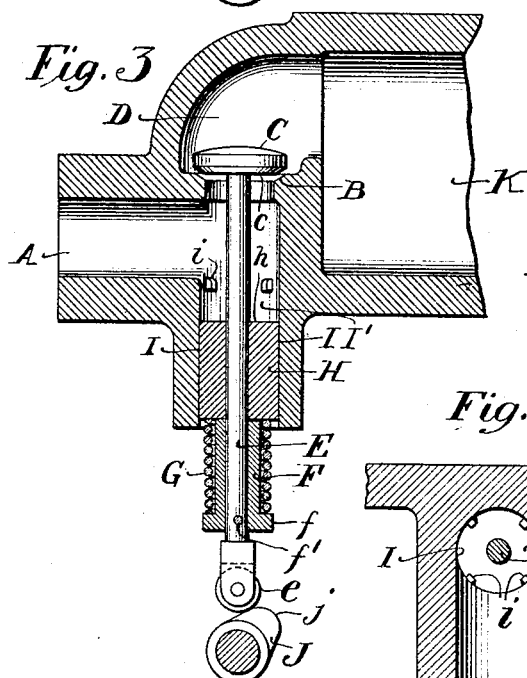
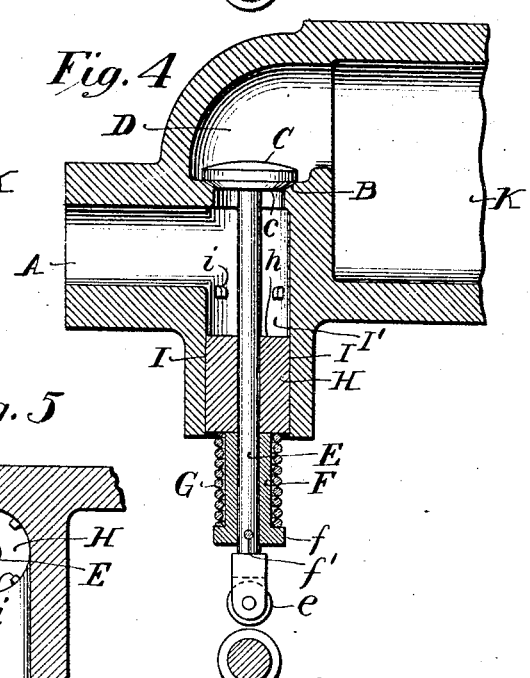
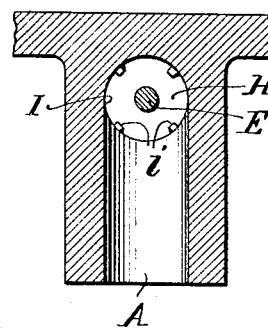
WITNESSES:
M. F. Ellis
M. M. Hamilton
INVENTOR
Herman Dock
BY
Harding & Harding
ATTORNEYS No. 765,727. Patented July 26, 1904.

UNITED STATES PATENT OFFICE.

HERMAN DOCK, OF PHILADELPHIA, PENNSYLVANIA.

PUPPET-VALVE.

SPECIFICATION forming part of Letters Patent No. 765,727, dated July 26, 1904.

Application filed November 5, 1903. Serial No. 179,874. (No model.)

*To all whom it may concern:*

Be it known that I, HERMAN DOCK, a citizen of the United States, residing at Philadelphia, county of Philadelphia, and State of Pennsylvania, have invented a new and useful Improvement in Puppet-Valves, of which the following is a full, clear, and exact description, reference being had to the accompanying drawings, which form a part of this specification.

My invention has for its object certain improvements in the construction of or additions to puppet-valve mechanism where the valve is operated to admit or cut off the admission of air, gas, or steam under pressure whereby the puppet-valve is seated with certainty when the operative means has been released from the valve-stem even though the pressure be not cut off.

In the accompanying drawings I have shown only such parts of the mechanism as are necessary to illustrate my invention, as the same is applicable to any class of engines with which a puppet-valve is used.

In the drawings, Figure 1 is a sectional view showing my invention with the valve seated, the valve-stem being off the high part of the operating-cam and pressure off. Fig. 2 is a view similar to Fig. 1 with the valve open and the stem on the high part of the operating-cam and pressure on. Fig. 3 is a section similar to Figs. 1 and 2 with the parts in the position they would take after the high point of the operating-cam has passed beyond contact with the stem and the pressure still on. Fig. 4 is a section similar to Fig. 1 with pressure still on. Fig. 5 is a section on line 5 5, Fig. 1.

A is the passage leading from a source of pressure-supply.

B is the valve-seat, and C the valve controlling the connection between the passage A and the passage D to the cylinder K.

E is the valve-stem, having at its lower end the sleeve F, to which it is connected by the pin $f'$. This sleeve is provided with a flange $f$, forming an abutment for one end of a coil-spring G, the other end resting against the piston H, through which the stem E passes with a sliding fit. This piston is fitted in the passage I', opening into the pressure-passage A, with the walls I I of which it makes a sliding fit, the projecting portions $i$ of which walls form stops for limiting the upward movement of the piston. The upper face $h$ of this piston between the stops $i$ $i$ is of greater area than the area of the under face $c$ of the valve C.

J is the operating-cam, moved by any well-known mechanism and contacting with a roller $e$ on the end of the stem E. This cam J has the high point $j$. The operation of this cam is well known, and, as is well known, in its revolution gives the proper movement to the valve-stem. The parts being in the position shown in Fig. 1 and the cam J rotated so as to operate the valve-stem E by the high part $j$, the valve C is lifted from its seat and the pressure in the passage passes into the passage G. At the same time by reason of the greater area of the portion $h$ of the piston H over that of the lower face $c$ of the valve C the piston will be forced downward, compressing the spring G until the piston rests upon the end of the sleeve F. This is the position of the parts shown in Fig. 2. Now when the cam J is moved so as to bring the high part $j$ beyond the valve-stem E, even though pressure in the passage A be not cut off, the pressure will act upon the piston, forcing it and the valve-stem downward, following the cam. (See Fig. 3.) Now when the cam is moved to bring the low point of the cam opposite the stem and the pressure still on the pressure acting on the piston will force the stem downward until the valve seats and holds it there, Fig. 4. When pressure is cut off, the spring G will return the piston to the initial position against the stops $i$ $i$, the spring G then holding the valve seated. (See Fig. 1.)

As may be seen by the foregoing construction and mode of operation, while I do not depart from the use of gravity or the addition of a spring for seating the puppet-valve I do provide an improved construction whereby the puppet-valve is seated whenever it is so desired to be, whether the pressure be or be not cut off, and thereby provide a positive and certain seating of the valve at all times. With this improved construction my valve acts with more certainty in marine engines and may be used with effect where it cannot now be used in the case of initial starting or reversing of gas or other motors.

Having now fully described my invention, what I claim, and desire to protect by Letters Patent, is—

1. In combination, a passage from a source of pressure-supply, a cylinder, connection between the pressure-passage and cylinder, a valve controlling the connection between the cylinder and pressure-passage, a piston adapted in its movement to close the valve, one face of said piston being subject at all times to a pressure sufficient to close the valve, and means acting on the valve against said pressure to move it in the opposite direction.

2. In combination, a passage from a source of pressure-supply, a cylinder, connection between the pressure-passage and the cylinder, a valve controlling the connection between the cylinder and pressure-passage, a piston, one face only of which is in communication with the pressure-supply, adapted to move the valve to close it, said face being in constant communication with the pressure-supply and means acting on the valve against said pressure to move it in the opposite direction.

3. In combination, a passage from a source of pressure-supply, a cylinder, connection between the pressure-passage and cylinder, a valve controlling the connection between said pressure-passage and cylinder, a piston adapted in its movement to close the valve, one face of said piston being subject at all times to a pressure sufficient to close the valve, and means acting on the valve against said pressure to move it in the opposite direction, the area of the face of the piston exposed to pressure being greater than the area of the face of the valve exposed to pressure.

4. In combination, a passage from a source of pressure-supply, a cylinder, connection between the pressure-passage and cylinder, a valve controlling the connection between said pressure-passage and cylinder, a piston one face only of which is in communication with the pressure-supply, adapted to move the valve to close it, said face being in constant communication with the pressure-supply, and means acting on the valve against said pressure to move it in the opposite direction, the area of the face of the piston exposed to pressure being greater than the area of the face of the valve exposed to pressure.

5. In combination, a passage from a source of pressure-supply, a cylinder, connection between the pressure-passage and cylinder, a valve controlling the connection between the pressure-passage and cylinder, a passage opening into the pressure-passage, a piston in said last-mentioned passage, connection between the piston and valve, one face of the piston being subject at all times to a pressure sufficient to close the valve in said last-mentioned passage, whereby the pressure acting on the piston tends to close the valve.

6. In combination, a passage from a source of pressure-supply, a cylinder, connection between the pressure-passage and cylinder, a valve controlling the connection between the pressure-passage and cylinder, a passage opening into the pressure-passage, a piston in said last-mentioned passage, one face only of which is in communication with the pressure-supply, said face being in constant communication with the pressure-supply, and connection between the piston and valve, whereby the pressure acting on the piston tends to close the valve.

7. In combination, a passage from a source of pressure-supply, a cylinder, connection between the pressure-passage and cylinder, a valve controlling the connection between the pressure-passage and cylinder, a passage opening into the pressure-passage, a piston in said last-mentioned passage, connection between the piston and valve, one face of said piston being subject at all times to a pressure sufficient to close the valve, whereby the pressure acting on the piston tends to close the valve, the face of the piston exposed to pressure being greater than the face of the valve exposed to pressure.

8. In combination, a passage from a source of pressure-supply, a cylinder, connection between the pressure-passage and cylinder, a valve controlling the connection between the pressure-passage and cylinder, a passage opening into the pressure-passage, a piston in the last-mentioned passage, one face only of which is in communication with the pressure-supply, said face being in constant communication with the pressure-supply, and connection between the piston and valve, whereby the pressure acting on the piston tends to close the valve, the face of the piston exposed to pressure being greater than the face of the valve exposed to pressure.

9. In combination, a passage from a source of pressure-supply, a cylinder, connection between said pressure-passage and cylinder, a valve, having a stem, controlling the connection between said pressure-passage and cylinder, a passage communicating with the pressure-supply, the stem of said valve passing through said third passage, a piston surrounding said stem, one face of which is in constant communication with the pressure-supply and connection between said piston and stem whereby the pressure acting on the piston tends to close the valve.

10. In combination, a passage from a source of pressure-supply, a cylinder, connection between said pressure-passage and cylinder, a valve, having a stem, controlling the connection between said pressure-passage and cylinder, a passage communicating with the pressure-supply, the stem of said valve passing through said last-mentioned passage, a piston surrounding said stem, and connection, having a limited play, between said piston and stem.

11. In combination, a passage from a source of pressure-supply, a cylinder, connection between said pressure-passage and cylinder, a valve, having a stem, controlling the connection between said pressure-passage and cylinder, a passage communicating with the pressure-supply, the stem of said valve passing through said last-mentioned passage, a piston surrounding said stem, one face of which is in constant communication with the pressure-supply and connection between said piston and stem, whereby the pressure acting on the piston tends to close the valve and mechanical means to lift said stem and valve.

12. In combination, a passage from a source of pressure-supply, a cylinder, connection between said pressure-passage and cylinder, a valve having a stem controlling the connection between said passages, a passage communicating with the pressure-supply, the stem of said valve passing through said last-mentioned passage, a piston surrounding said stem, and connection, having a limited play, between said piston and stem, and mechanical means to lift said stem and valve.

13. In combination, a passage from a source of pressure-supply, a cylinder, connection between said pressure-passage and cylinder, a valve, having a stem, controlling the connection between said pressure-passage and cylinder, a passage communicating with the pressure-supply, the stem of said valve passing through said passage, a sleeve secured to said stem, a piston in said last-mentioned passage surrounding said stem and a spring between said sleeve and piston.

14. In combination, a passage from a source of pressure-supply, a cylinder, connection between said pressure-passage and cylinder, a valve having a stem, controlling the connection between said pressure-passage and cylinder, a passage communicating with the pressure-supply, the stem of said valve passing through said last-mentioned passage, a sleeve secured to said stem, a piston in said last-mentioned passage surrounding said stem and a spring between said sleeve and piston, and mechanical means to lift said stem and valve.

15. In combination, a passage from a source of pressure-supply, a cylinder, connection between said pressure-passage and cylinder, a valve, having a stem, controlling the connection between said pressure-passage and cylinder, a passage communicating with the pressure-supply, the stem of said valve passing through said last-mentioned passage, a sleeve secured to said stem, a piston in said last-mentioned passage surrounding said stem and a spring between said sleeve and piston, and a cam having high and low points upon which the end of said stem rests.

In testimony of which invention I have hereunto set my hand at Philadelphia on this 28th day of October, 1903.

HERMAN DOCK.

Witnesses:
M. F. ELLIS,
M. M. HAMILTON.